US 7,290,207 B2

(12) United States Patent
Colbath et al.

(10) Patent No.: US 7,290,207 B2
(45) Date of Patent: Oct. 30, 2007

(54) SYSTEMS AND METHODS FOR PROVIDING MULTIMEDIA INFORMATION MANAGEMENT

(75) Inventors: Sean Colbath, Cambridge, MA (US); Scott Shepard, Waltham, MA (US); Francis G. Kubala, Boston, MA (US)

(73) Assignee: BBN Technologies Corp., Cambridge, MA (US)

(*) Notice: Subject to any disclaimer, the term of this patent is extended or adjusted under 35 U.S.C. 154(b) by 235 days.

(21) Appl. No.: 10/610,697

(22) Filed: Jul. 2, 2003

(65) Prior Publication Data

US 2004/0006576 A1 Jan. 8, 2004

Related U.S. Application Data

(60) Provisional application No. 60/419,214, filed on Oct. 17, 2002, provisional application No. 60/394,082, filed on Jul. 3, 2002, provisional application No. 60/394,064, filed on Jul. 3, 2002.

(51) Int. Cl.
*G06F 17/30* (2006.01)
(52) U.S. Cl. ..................... 715/530; 715/513; 707/102
(58) Field of Classification Search ................ 715/530, 715/513; 707/102
See application file for complete search history.

(56) References Cited

U.S. PATENT DOCUMENTS

| | | |
|---|---|---|
| 4,879,648 A | 11/1989 | Cochran et al. |
| 4,908,866 A | 3/1990 | Goldwasser et al. |
| 5,317,732 A | 5/1994 | Gerlach, Jr. et al. |
| 5,404,295 A | 4/1995 | Katz et al. |
| 5,418,716 A | 5/1995 | Suematsu |
| 5,544,257 A | 8/1996 | Bellegarda et al. |
| 5,559,875 A | 9/1996 | Bieselin et al. |
| 5,572,728 A | 11/1996 | Tada et al. |

(Continued)

FOREIGN PATENT DOCUMENTS

EP 0664636 7/1995

(Continued)

OTHER PUBLICATIONS

Amit Srivastava et al.: "Sentence Boundary Detection in Arabic Speech," 8th *European Conference on Speech Communication and Technology*, Sep. 1-4, 2003 in Geneva, Switzerland; 4 pages.

(Continued)

*Primary Examiner*—Stephen Hong
*Assistant Examiner*—Matthew Ludwig
(74) *Attorney, Agent, or Firm*—Ropes & Gray LLP

(57) ABSTRACT

A system facilitates the searching and retrieval of multimedia data items. The system receives data items from different types of media sources and identifies regions in the data items. The regions include document regions, section regions, and passage regions. Each of the section regions corresponds to one of the document regions and each of the passage regions corresponds to one of the section regions and one of the document regions. The system stores document identifiers that relate to the document regions in separate document records in a document table, section identifiers that relate to the section regions in separate section records in a section table, and passage identifiers that relate to the passage regions in separate passage records in a passage table.

47 Claims, 9 Drawing Sheets

U.S. PATENT DOCUMENTS

| | | | |
|---|---|---|---|
| 5,684,924 A | 11/1997 | Stanley et al. | |
| 5,715,367 A | 2/1998 | Gillick et al. | |
| 5,752,021 A * | 5/1998 | Nakatsuyama et al. | 707/5 |
| 5,757,960 A | 5/1998 | Murdock et al. | |
| 5,768,607 A | 6/1998 | Drews et al. | |
| 5,777,614 A | 7/1998 | Ando et al. | |
| 5,787,198 A | 7/1998 | Agazzi et al. | |
| 5,835,667 A | 11/1998 | Wactlar et al. | |
| 5,862,259 A | 1/1999 | Bokser et al. | |
| 5,875,108 A | 2/1999 | Hoffberg et al. | |
| 5,960,447 A | 9/1999 | Holt et al. | |
| 5,963,940 A | 10/1999 | Liddy et al. | |
| 5,970,473 A | 10/1999 | Gerszberg et al. | |
| 6,006,221 A | 12/1999 | Liddy et al. | |
| 6,024,571 A | 2/2000 | Renegar | |
| 6,029,124 A | 2/2000 | Gillick et al. | |
| 6,029,195 A | 2/2000 | Herz | |
| 6,052,657 A | 4/2000 | Yamron et al. | |
| 6,064,963 A | 5/2000 | Gainsboro | |
| 6,067,514 A | 5/2000 | Chen | |
| 6,067,517 A | 5/2000 | Bahl et al. | |
| 6,088,669 A | 7/2000 | Maes | |
| 6,112,172 A | 8/2000 | True et al. | |
| 6,151,598 A * | 11/2000 | Shaw et al. | 707/3 |
| 6,161,087 A | 12/2000 | Wightman et al. | |
| 6,169,789 B1 | 1/2001 | Rao et al. | |
| 6,185,531 B1 | 2/2001 | Schwartz et al. | |
| 6,219,640 B1 | 4/2001 | Basu et al. | |
| 6,317,716 B1 | 11/2001 | Braida et al. | |
| 6,332,139 B1 | 12/2001 | Kaneko et al. | |
| 6,332,147 B1 | 12/2001 | Moran et al. | |
| 6,360,237 B1 | 3/2002 | Schulz et al. | |
| 6,373,985 B1 | 4/2002 | Hu et al. | |
| 6,381,640 B1 | 4/2002 | Powers et al. | |
| 6,434,520 B1 | 8/2002 | Kanevsky et al. | |
| 6,437,818 B1 | 8/2002 | Lauwers et al. | |
| 6,480,826 B2 | 11/2002 | Pertrushin | |
| 6,602,300 B2 | 8/2003 | Ushioda et al. | |
| 6,604,110 B1 * | 8/2003 | Savage et al. | 707/102 |
| 6,647,383 B1 | 11/2003 | August et al. | |
| 6,654,735 B1 | 11/2003 | Eichstaedt et al. | |
| 6,708,148 B2 | 3/2004 | Gschwendtner et al. | |
| 6,714,911 B2 | 3/2004 | Waryas et al. | |
| 6,718,303 B2 | 4/2004 | Tang et al. | |
| 6,778,958 B1 | 8/2004 | Nishimura et al. | |
| 6,792,409 B2 | 9/2004 | Wutte | |
| 6,847,961 B2 | 1/2005 | Silverbrook et al. | |
| 6,922,691 B2 | 7/2005 | Flank | |
| 6,931,376 B2 | 8/2005 | Lipe et al. | |
| 6,961,954 B1 | 11/2005 | Maybury et al. | |
| 6,973,428 B2 | 12/2005 | Boguraev et al. | |
| 6,999,918 B2 | 2/2006 | Ma et al. | |
| 7,131,117 B2 | 10/2006 | Mills et al. | |
| 2001/0026377 A1* | 10/2001 | Ikegami | 358/401 |
| 2001/0051984 A1 | 12/2001 | Fukusawa | |
| 2002/0010575 A1 | 1/2002 | Haase et al. | |
| 2002/0010916 A1* | 1/2002 | Thong et al. | 725/1 |
| 2002/0059204 A1 | 5/2002 | Harris | |
| 2002/0184373 A1 | 12/2002 | Maes | |
| 2003/0051214 A1 | 3/2003 | Graham et al. | |
| 2003/0093580 A1 | 5/2003 | McGee et al. | |
| 2003/0167163 A1 | 9/2003 | Glover et al. | |
| 2004/0024739 A1 | 2/2004 | Copperman et al. | |
| 2004/0073444 A1* | 4/2004 | Peh et al. | 705/1 |
| 2005/0060162 A1 | 3/2005 | Mohit et al. | |
| 2006/0129541 A1 | 6/2006 | Morgan et al. | |

FOREIGN PATENT DOCUMENTS

| | | |
|---|---|---|
| EP | 0935378 | 8/1999 |
| EP | 0715298 | 6/2000 |
| EP | 1079313 | 2/2001 |
| EP | 1103952 | 5/2001 |
| EP | 1176493 | 1/2002 |
| EP | 1 422 692 A2 | 5/2004 |
| JP | 361285570 A | 12/1986 |
| WO | WO-99/17235 | 4/1999 |
| WO | WO-00/59223 | 10/2000 |
| WO | WO-02/29612 | 4/2002 |
| WO | WO-02/29614 | 4/2002 |

OTHER PUBLICATIONS

Sreenivasa Sista et al.: "Unsupervised Topic Discovery Applied To Segmentation Of News Transciptions," $8^{th}$ *European Conference on Speech Communication and Technology*, Sep. 1-4, 2003 in Geneva. Switzerland; 4 pages.

Daben Liu et al.: "Online Speaker Clustering," *ICASSP 2003*, vol. 1, pp. 572-575, 2003 Hong Kong.

J. Billa et al.: "Audio Indexing Of Arabic Broadcast News," *ICASSP 2002*; Orlando, FL; May 13-17, 2002; 4 pages.

Scott Shepard et al.: "Oasis Translator's Aide," *Human Language Technology Conference*; San Diego, California; 2002; 2 pages.

Scott Shepard et al.: "Newsroom OnTAP—Real-time alerting from streaming audio," Dec.-Jan. 2001 HLT Paper; 2 pages.

Heidi Christensen et al.: "Punctuation Annotation using Statistical Prosody Models," *The Proceedings of Eurospeech*, Denmark, 2001; 6 pages.

Ji-Hwan Kim et al.: "The Use Of Prosody In A Combined System For Punctuation Generation And Speech Recognition," *The Proceedings of Eurospeech*, Denmark, 2001; 4 pages.

Jing Huang et al.: "Maximum Entropy Model For Punctuation Annotation From Speech," *The Proceedings of Eurospeech*, Denmark, 2001 ; pp. 917-920.

Yoshihiko Gotoh et al.: "Sentence Boundary Detection in Broadcast Speech Transcripts," *Proceedings of the International Speech Communication Association Workshop: Automatic Speech Recognition: Challenges for the New Millennium*, Paris, Sep. 2000; 8 pages.

John Makhoul et al.: "Speech and Language Technologies for Audio Indexing and Retrieval," *Proceedings of the IEEE*, vol. 88, No. 8, Aug. 2000; pp. 1338-1353.

Francis Kubala et al.: "Integrated Technologies For Indexing Spoken Language," *Communications of the ACM*, vol. 43, No. 2, Feb. 2000; pp. 48-56.

Sean Colbath et al.: "Spoken Documents: Creating Searchable Archives from Continuous Audio," *Proceedings of the $33^{rd}$ Hawaii International Conference on System Sciences-2000*; pp. 1-9.

Francis Kubala et al.: "Situation Awareness Contexts for Smart Environments," *Inter-Agency Workshop on Research Issues for Smart Environments*; Atlanta, GA; 2000; 3 pages.

Daben Liu et al.: "Fast Speaker Change Detection For Broadcast News Transcription And Indexing," *The Proceedings of Eurospeech 1999*; Budapest, Hungary; 4 pages.

Daniel M. Bikel et al.: "An Algorithm that Learns What's in a Name," *Machine Learning*, 1999; pp. 1-20.

Richard Schwartz et al.: "Accurate Near-Real-Time Recognition of Broadcast News using Multiple-Pass Search Techniques," *1999 Workshop on Automatic Speech Recognition and Understanding*, Dec. 12-15, 1999; Keystone, Colorado; 6 pages.

Francis Kubala et al.: "Smart Information Spaces: Managing Personal and Collaborative Histories," *Proceedings of the 1998 DARPA/NIST Smart Spaces Workshop*, Jul. 30-31, 1998; 6 pages.

Daben Liu et al.: "Improvements in Spontaneous Speech Recognition," *Proceedings of the DARPA Broadcast News Transcription and Understanding Workshop*; Feb. 8-11, 1998 in Lansdowne, Virginia; 5 pages.

Francis Kubala et al.: "The 1997 BBN Byblos System Applied To Broadcast News Transcription," Cambridge, Massachusetts; 1997; 6 pages.

Hubert Jin et al.: "Automatic Speaker Clustering," *ICFEM*, Chantilly, Virginia; Feb. 1997; 4 pages.

Sean Colbath et al.: "OnTAP: Mixed-media Multi-lingual Language Processing," *Human Language Technology Conference*, San Diego, CA; 2002; 2 pages.

Andreas Stolcke et al.: "Automatic Linguistic Segmentation Of Conversational Speech," *Proceedings of the International Conference on Spoken Language Processing*, vol. 2, Philadelphia 1996; pp. 1005-1008.

Scott S. Chen et al.: "Speaker, Environment and Channel Change Detection and Clustering via the Bayesian Information Criterion," in DARPA Speech Recognition Workshop, 1998, 6 pages.

Marti A. Hearst: "Multi-Paragraph Segmentation of Expository Text," in Proceedings of the 2nd Annual Meeting of the Association for Computational Linguistics, New Mexico State University, Las Cruces, NM, 1994, pp. 1-8.

Beigi et al., "A Distance Measure Between Collections of Distributions and its Applications to Speaker Recognition" IEEE International Conference on Acoustics, Speech and Signal Processing, ICASSP'89, May 12-15, 1998, vol. 2, pp. 753-756.

Ferret et al, "A Thematic Segmentation Procedure for Extracting Semantic Domains from Texts," ECAI '98, Brighton, UK 1998.

Cutting, et al "A Practical Part-of-Speech Tagger," Proceedings of the 3rd Conference on Applied Natural Language Processing, ACL 1992, pp. 133-140.

Beeferman et al, "Cyberpunc: A Lightweight Punctuation Annotation System for Speech," Proceedings of the 1999 IEEE Conference on Acoustics, Speech and Signal Processing, ICASSP'98 May 12-15, 1999, 2:689-692.

Shriberg et al, "Can Prosody Aid the Automatic Processing of Multi-Party Meetings? Evidence from Predicting Punctuation, Disfluencies, and Overlapping Speech," Proceedings of the ISCA Tutorial and Research Workshop on Prosody in Speech Recognition and Understanding, Oct. 2001, pp. 139-140.

Guavain et al, "Transcribing Broadcast News Shows," IEEE International Conference on Acoustics, Speech and Signal Processing, ICASSP'97, 2:21-24, Apr. 1997, p. 715-718.

Waibel et al, "Meeting Browser: Tracking and Summarizing Meetings," Proceedings of DARPA Broadcast News Workshop, 1998.

* cited by examiner

SYSTEMS AND METHODS FOR PROVIDING MULTIMEDIA INFORMATION MANAGEMENT

RELATED APPLICATIONS

This application claims priority under 35 U.S.C. §119 based on U.S. Provisional Application Nos. 60/394,064 and 60/394,082, filed Jul. 3, 2002, and Provisional Application No. 60/419,214, filed Oct. 17, 2002, the disclosures of which are incorporated herein by reference.

GOVERNMENT CONTRACT

The U.S. Government may have a paid-up license in this invention and the right in limited circumstances to require the patent owner to license others on reasonable terms as provided for by the terms of Contract No. N66001-00-C-8008 awarded by the Defense Advanced Research Projects Agency.

BACKGROUND OF THE INVENTION

1. Field of the Invention

The present invention relates generally to multimedia environments and, more particularly, to systems and methods for managing multimedia information.

2. Description of Related Art

Much of the information that exists today is not easily manageable. For example, databases exist for storing different types of multimedia information. Typically, these databases treat audio and video differently from text. Audio and video data are usually assigned text annotations to facilitate their later retrieval. Traditionally, the audio and video data are assigned the text annotations manually, which is a time-consuming task. The annotations also tended to be insufficient to unambiguously describe the media content. Automatic database creation systems were developed but did not solve the problems of the ambiguous annotations.

As a result, there is a need for systems and methods for managing multimedia information in a manner that is transparent to the actual type of media involved.

SUMMARY OF THE INVENTION

Systems and methods consistent with the present invention address this and other needs by providing multimedia information management in a manner that treats different types of data (e.g., audio, video, and text) the same for storage and retrieval purposes. A set of keys (document, section, and passage) are chosen that are common to all of the data types. Data may be assigned relative to the keys.

In one aspect consistent with the principles of the invention, a system facilitates the searching and retrieval of multimedia data items. The system receives data items from different types of media sources and identifies regions in the data items. The regions include document regions, section regions, and passage regions. Each of the section regions corresponds to one of the document regions and each of the passage regions corresponds to one of the section regions and one of the document regions. The system stores document identifiers that relate to the document regions in separate document records in a document table, section identifiers that relate to the section regions in separate section records in a section table, and passage identifiers that relate to the passage regions in separate passage records in a passage table.

In another aspect consistent with the principles of the invention, a method for storing multimedia data items in a database is provided. The method includes receiving data items from different types of media sources and identifying regions of the data items. The regions include document regions, section regions, and passage regions. Each of the section regions corresponds to one of the document regions and each of the passage regions corresponds to one of the section regions and one of the document regions. The method further includes generating document keys for the document regions, section keys for the section regions, and passage keys for the passage regions. The method also includes storing the document keys in a document table in the database, storing the section keys and corresponding ones of the document keys in a section table in the database, and storing the passage keys and corresponding ones of the document keys and the section keys in a passage table in the database.

In a further aspect consistent with the principles of the invention, a database is provided. The database stores data items relating to different types of media. The data items include regions, such as document regions, section regions, and passage regions. Each of the section regions corresponds to one of the document regions and each of the passage regions corresponds to one of the section regions and one of the document regions. The database includes a document table, a section table, and a passage table. The document table stores document keys that identify the document regions as document records. The section table stores section keys that identify the section regions as section records. The section records also store corresponding ones of the document keys. The passage table stores passage keys that identify the passage regions as passage records. The passage records also store corresponding ones of the section keys and the document keys.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide multimedia information management in a manner that treats different types of media the same for storage and retrieval purposes.

Exemplary System

Figure 1:
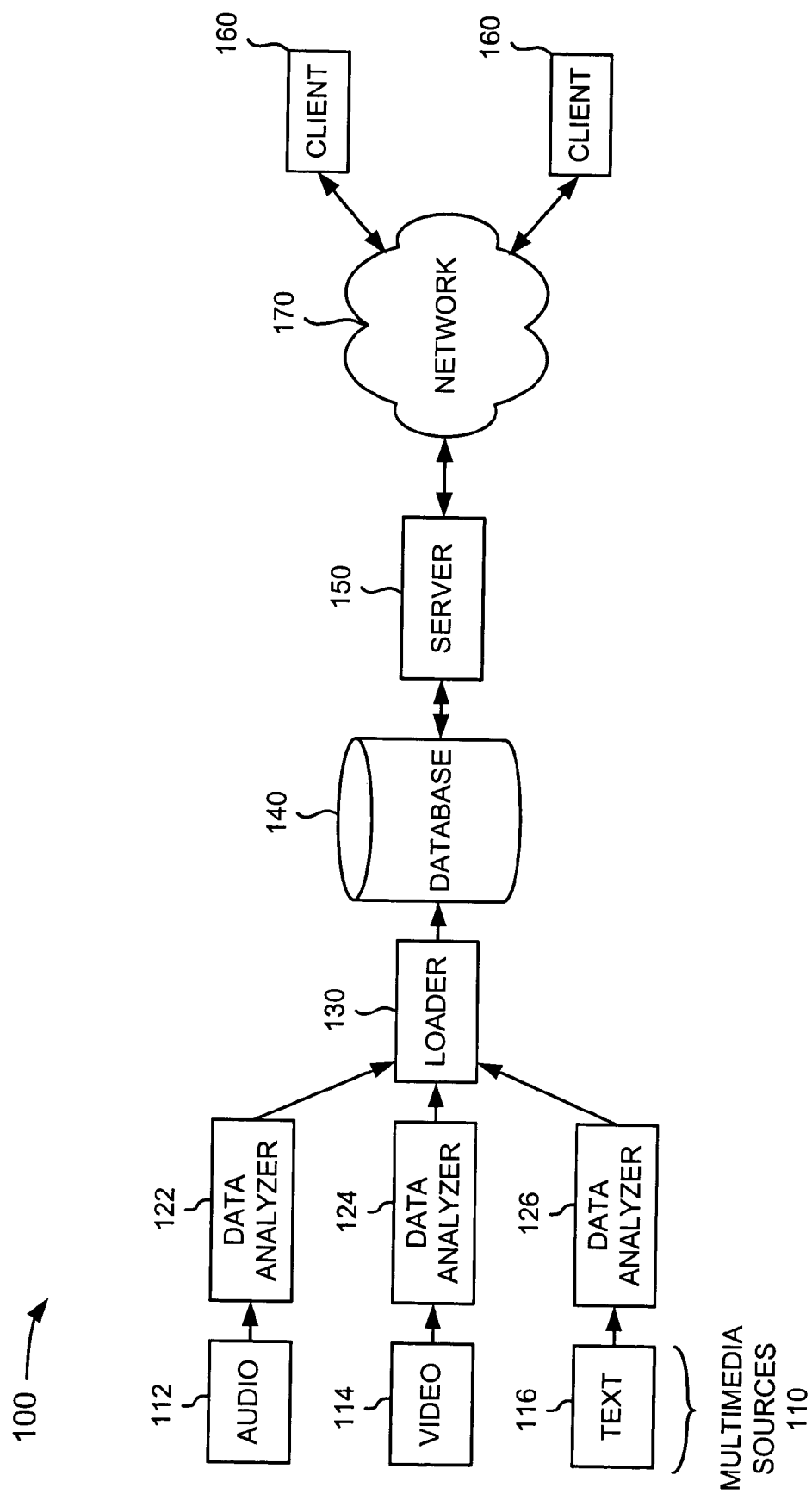
FIG. 1 is a diagram of a system in which systems and methods consistent with the present invention may be implemented.

FIG. 1 is a diagram of an exemplary system 100 in which systems and methods consistent with the present invention may be implemented. System 100 may include multimedia sources 110, data analyzers 122-126, loader 130, database 140, and server 150 connected to clients 160 via network 170. Network 170 may include any type of network, such as a local area network (LAN), a wide area network (WAN) (e.g., the Internet), a public telephone network (e.g., the Public Switched Telephone Network (PSTN)), a virtual private network (VPN), or a combination of networks. The various connections shown in FIG. 1 may be made via wired, wireless, and/or optical connections.

Multimedia sources 110 may include audio sources 112, video sources 114, and text sources 116. Audio sources 112 may include any source of audio data, such as radio, telephone, and conversations. Video sources 114 may include any source of video data, such as television, satellite, and a camcorder. Text sources 116 may include any source of text, such as e-mail, web pages, newspapers, and word processing documents.

Data analyzers 122-126 may include any mechanism that captures the data from multimedia sources 110, performs data processing and feature extraction, and outputs analyzed, marked up, and enhanced language metadata. In one implementation consistent with the principles of the invention, data analyzers 122-126 include a system, such as the one described in John Makhoul et al., "Speech and Language Technologies for Audio Indexing and Retrieval," Proceedings of the IEEE, Vol. 88, No. 8, August 2000, pp. 1338-1353, which is incorporated herein by reference.

Data analyzer 122 may receive an input audio stream or file from audio sources 112 and generate metadata therefrom. For example, data analyzer 122 may segment the input stream/file by speaker, cluster audio segments from the same speaker, identify speakers known to data analyzer 122, and transcribe the spoken words. Data analyzer 122 may also segment the input stream/file based on topic and locate the names of people, places, and organizations (i.e., named entities). Data analyzer 122 may further analyze the input stream/file to identify the time at which each word is spoken (e.g., identify a time code). Data analyzer 122 may include any or all of this information in the metadata relating to the input audio stream/file.

Data analyzer 124 may receive an input video stream or file from video sources 122 and generate metadata therefrom. For example, data analyzer 124 may segment the input stream/file by speaker, cluster video segments from the same speaker, identify speakers known to data analyzer 124, and transcribe the spoken words. Data analyzer 124 may also segment the input stream/file based on topic and locate the names of people, places, and organizations. Data analyzer 124 may further analyze the input stream/file to identify the time at which each word is spoken (e.g., identify a time code). Data analyzer 124 may include any or all of this information in the metadata relating to the input video stream/file.

Data analyzer 126 may receive an input text stream or file from text sources 116 and generate metadata therefrom. For example, data analyzer 126 may segment the input stream/file based on topic and locate the names of people, places, and organizations. Data analyzer 126 may further analyze the input stream/file to identify where each word occurs (possibly based on a character offset within the text). Data analyzer 126 may also identify the author and/or publisher of the text. Data analyzer 126 may include any or all of this information in the metadata relating to the input text stream/file.

Loader 130 may include logic that receives the metadata from data analyzers 122-126 and stores it in database 140 based on features of the metadata. Database 140 may include a relational database that stores data in a manner transparent to the type of media involved. Database 140 may store the metadata from loader 130 in multiple tables based on features of the metadata. Database 140 will be described in more detail below.

Server 150 may include a computer or another device that is capable of managing database 140 and servicing client requests for information. Server 150 may provide requested information to a client 160, possibly in the form of a HyperText Markup Language (HTML) document or a web page. Client 160 may include a personal computer, a laptop, a personal digital assistant, or another type of device that is capable of interacting with server 150 to obtain information of interest. Client 160 may present the information to a user via a graphical user interface, possibly within a web browser window.

Exemplary Database

Figure 2:
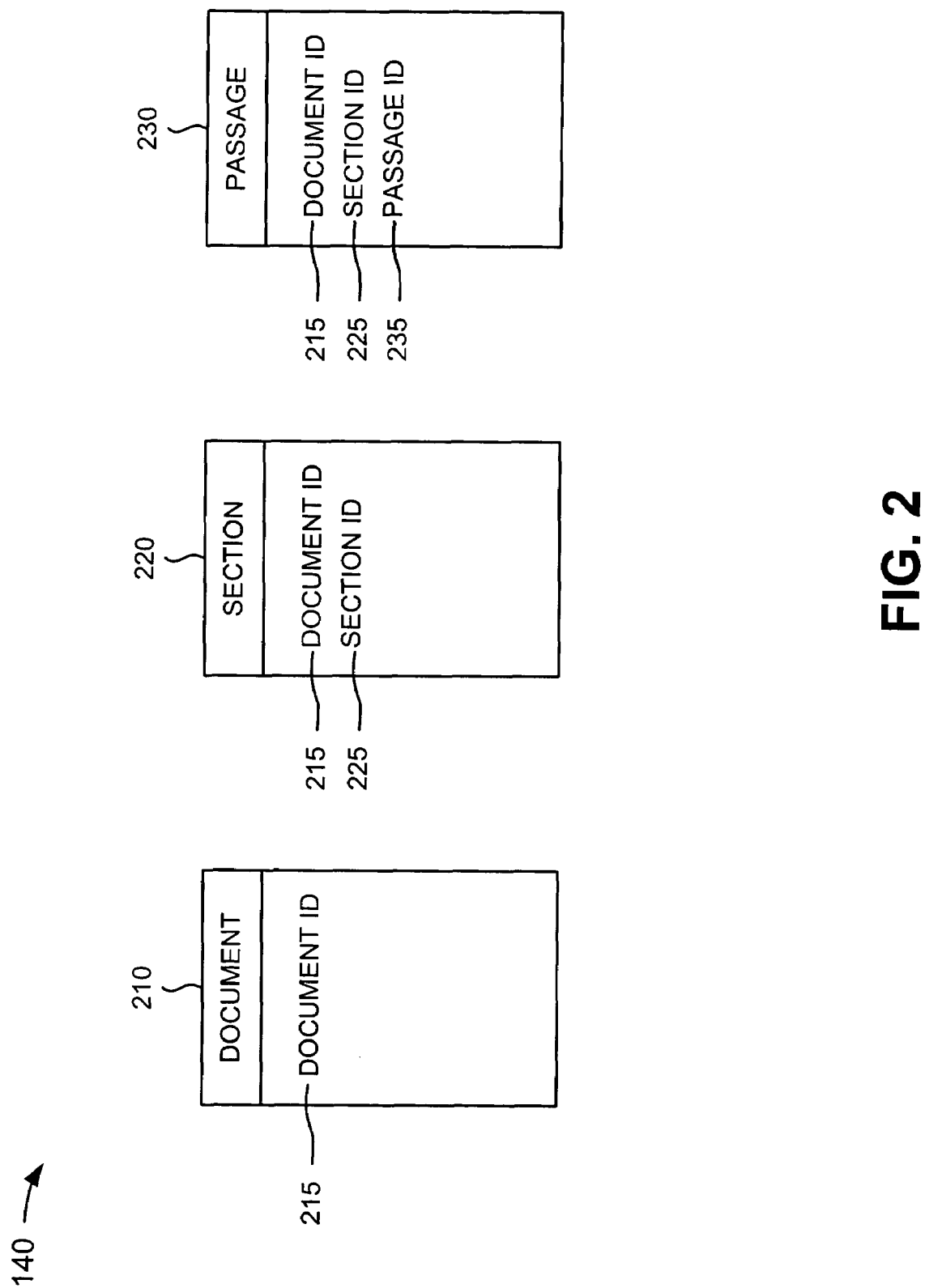
FIG. 2 is an exemplary diagram of a portion of the database of FIG. 1 according to an implementation consistent with the principles of the invention.

FIG. 2 is an exemplary diagram of a portion of database 140 according to an implementation consistent with the principles of the invention. In the portion of database 140 shown in FIG. 2, database 140 includes three tables: a document table 210, a section table 220, and a passage table 230. Before describing what is actually stored in these tables, it may be useful to define what is meant by document, section, and passage.

A document refers to a body of media that is contiguous in time (from beginning to end or from time A to time B) which has been processed and from which features have been extracted by data analyzers 122-126. Examples of documents might include a radio broadcast, such as NPR Morning Edition on Feb. 7, 2002, at 6:00 a.m. eastern, a television broadcast, such as NBC News on Mar. 19, 2002, at 6:00 p.m. eastern, and a newspaper, such as the Washington Post for Jan. 15, 2002.

A section refers to a contiguous region of a document that pertains to a particular theme or topic. Examples of sections might include local news, sports scores, and weather reports. Sections do not span documents, but are wholly contained within them. A document may have areas that do not have an assigned section. It is also possible for a document to have no sections.

A passage refers to a contiguous region within a section that has a certain linguistic or structural property. For example, a passage may refer to a paragraph within a text document or a speaker boundary within an audio or video document. Passages do not span sections, but are wholly contained within them. A section may have areas that do not have an assigned passage. It is also possible for a section to have no passages.

Figure 3:
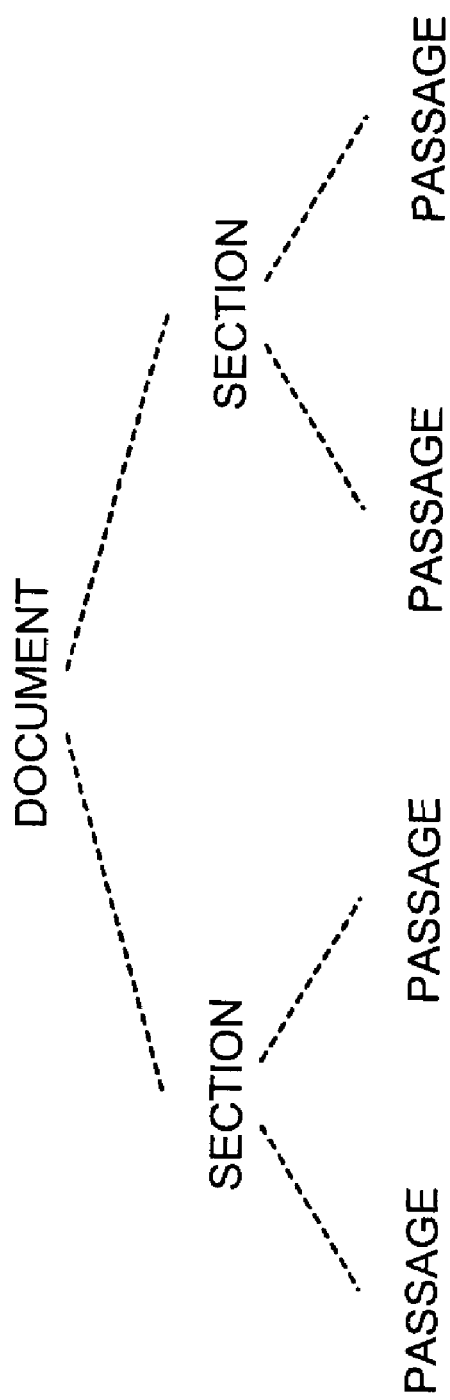
FIG. 3 is a diagram that illustrates a hierarchy of documents, sections, and passages.

Documents, sections, and passages may be considered to form a hierarchy. FIG. 3 is a diagram that illustrates this hierarchy. As shown in FIG. 3, a document may have zero or more sections (as shown by dotted lines from document to sections) and each section may have zero or more passages (as shown by dotted lines from section to passages).

Returning to FIG. 2, tables 210, 220, and 230 include a set of keys that are common to all types of media: a document key 215, a section key 225, and a passage key 235. A key in a relational database is a field or a combination of fields in a table that uniquely identify a record in the table or reference a record in another table. There are typically two types of keys: a primary key and a foreign key. A primary key uniquely identifies a record within a table. In other words, each record in a table is uniquely identified by one or more fields making up its primary key. A foreign key is a field or a combination of fields in one table whose values match fields of another table.

Document key 215 may include a field that uniquely identifies a document. Examples of document keys 215 might include "Joe's word processing document about the proposal," "NPR Morning Edition on Feb. 7, 2002, at 6:00 a.m. eastern," or "The Star Trek episode about the tribbles." Section key 225 may include a field that uniquely identifies a section within a particular document. A section key 225 may be unnamed, such as "Section 1," or may include a theme or topic identifier, such as "Story about Enron Scandal" or "Budget." Passage key 235 may include a field that uniquely identifies a passage within a particular section. A passage key 235 may be unnamed, such as "Passage 1," or may have an identifier that relates it to the particular feature of the document that it matches.

One or more of keys 215, 225, and 235 maybe associated with each of tables 210, 220, and 230. For example, document table 210 may include document key 215 as the primary key. Section table 220 may include document key 215 and section key 225 as the primary key. Because document key 215 is the primary key of document table 210, document key 215 is also a foreign key for section table 220. Passage table 230 may include document key 215, section key 225, and passage key 235 as the primary key. Because document key 215 and section key 225 are primary keys of document table 210 and section table 220, respectively, document key 215 and section key 225 are also foreign keys for passage table 230.

By combining keys 215, 225, and 235, any passage or section of a document may be uniquely identified based on the location of the passage or section within the document. For example, using document key 215, section key 225, and passage key 235 to uniquely identify a passage, it is easy to determine the section (using section key 225) and document (using document key 215) in which the passage is located. This relationship flows in both directions.

Figure 4:
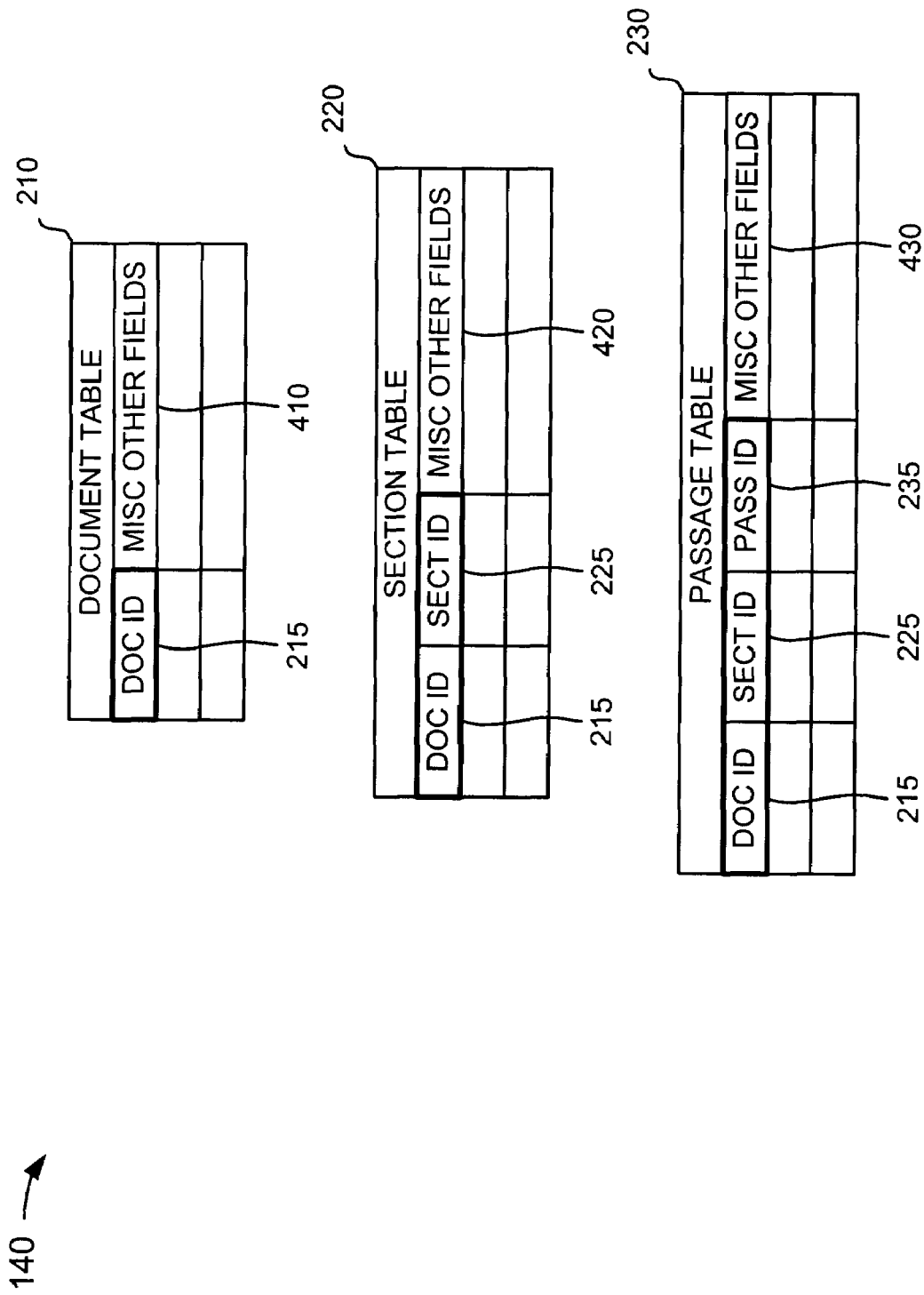
FIG. 4 is an exemplary diagram that illustrates a relationship of keys and other fields in the tables of FIG. 2 according to an implementation consistent with the principles of the invention.

FIG. 4 is a diagram that illustrates this relationship of keys 215, 225, and 235 and other fields in tables 210, 220, and 230 according to an implementation consistent with the principles of the invention. Document table 210 may include document key 215 and miscellaneous other fields 410. Miscellaneous other fields 410 may include fields relating to the time the document was created, the source of the document, a title of the document, the time the document started, the duration of the document, the region, subregion, and country in which the document originated, and/or the language in which the document was created.

Section table 220 may include document key 215, section key 225, and miscellaneous other fields 420. Miscellaneous other fields 420 may include fields relating to the start time of the section, the duration of the section, and/or the language in which the section was created. Passage table 230 may include document key 215, section key 225, passage key 235, and miscellaneous other fields 430. Miscellaneous other fields 430 may include fields relating to the start time of the passage, the duration of the passage, the name of a speaker in the passage, the gender of a speaker in the passage, and/or the language in which the passage was created.

Figure 5:
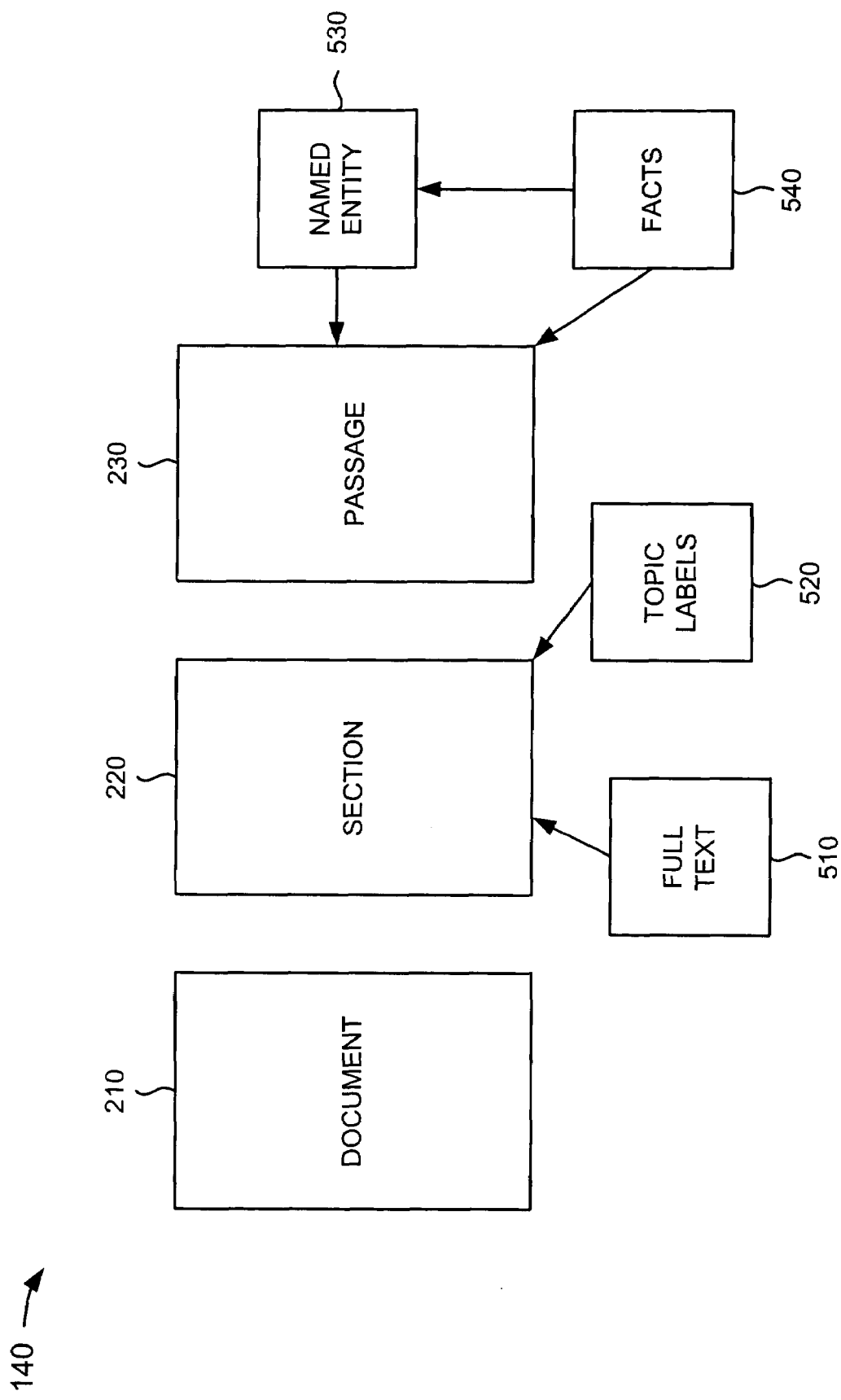
FIG. 5 is another diagram of a portion of the database of FIG. 1 according to another implementation consistent with the principles of the invention.

In other implementations consistent with the principles of the invention, database 140 may include additional tables to facilitate the searching and retrieval of data. FIG. 5 is a diagram of another portion of database 140 according to another implementation consistent with the principles of the invention. In this implementation, database 140 includes document table 210, section table 220, and passage table 230, as described above, but also includes full text table 510, topic labels table 520, named entity table 530, and facts table 540. Full text table 510 and topic labels table 520 may refer to section table 220. Named entity table 530 may refer to passage table 230. Facts table 540 may refer to passage table 230 and/or named entity table 530.

Figure 6:
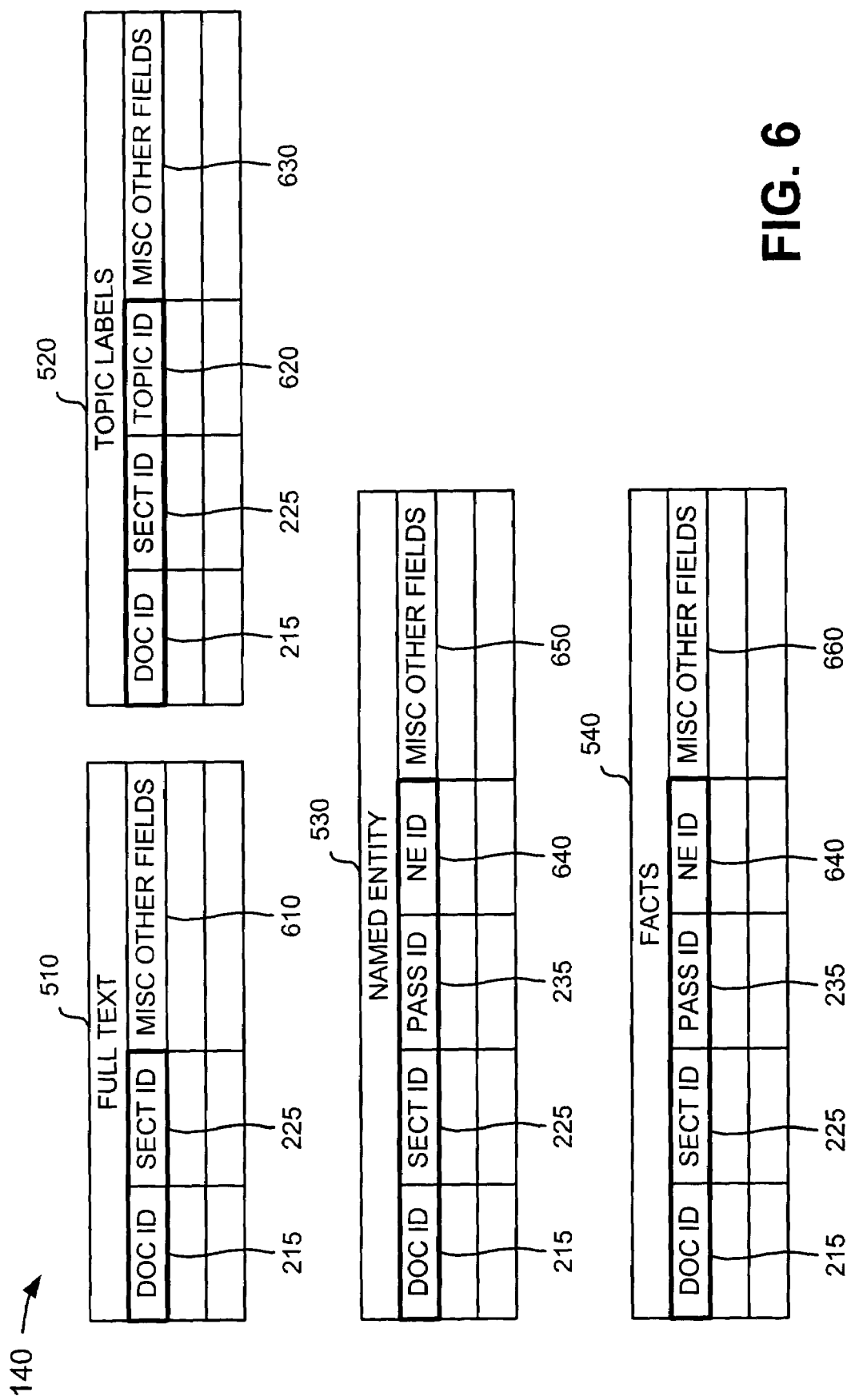
FIG. 6 is a detailed diagram of the full text table, topic labels table, named entity table, and facts table of FIG. 5 according to this additional implementation consistent with the principles of the invention.

FIG. 6 is a detailed diagram of full text table 510, topic labels table 520, named entity table 530, and facts table 540 according to this additional implementation consistent with the principles of the invention. Full text table 510 may include document key 215, section key 225, and miscellaneous other fields 610. Full text table 510 may include document key 215 and section key 225 as its primary key. Document key 215 and section key 225 are also foreign keys because they are primary keys for other tables. Miscellaneous other fields 610 may include the full text (including a transcription when the document is an audio or video document) of the document identified by document key 215.

Topic labels table 520 may include document key 215, section key 225, topic key 620, and miscellaneous other fields 630. Topic labels table 520 may include document key 215, section key 225, and topic key 620 as its primary key. Document key 215 and section key 225 are also foreign keys because they are primary keys for other tables. Miscellaneous other fields 630 may include topics, ranks, and scores relating to the section identified by section key 225 and/or the document identified by document key 215.

Named entity table 530 may include document key 215, section key 225, passage key 235, named entity (NE) key 640, and miscellaneous other fields 650. Named entity table 530 may include document key 215, section key 225, passage key 235, and named entity key 640 as its primary key. Document key 215, section key 225, and passage key 235 are also foreign keys because they are primary keys for other tables. Miscellaneous other fields 650 may include the type of named entity. A named entity may refer to a person, place, or organization within the passage identified by passage key 235, the section identified by section key 225, and/or the document identified by document key 215.

Facts table 540 may include document key 215, section key 225, passage key 235, and named entity key 640, and miscellaneous other fields 660. Facts table 540 may include document key 215, section key 225, passage key 235, and named entity key 640 as its primary key. Document key 215, section key 225, passage key 235, and named entity key 640 are also foreign keys because they are primary keys for other tables. Miscellaneous other fields 660 may include factual information, regarding the named entity identified by named entity key 640, that answers questions, such as who did what where, who said what, and where is that.

Exemplary Processing

Figure 7:
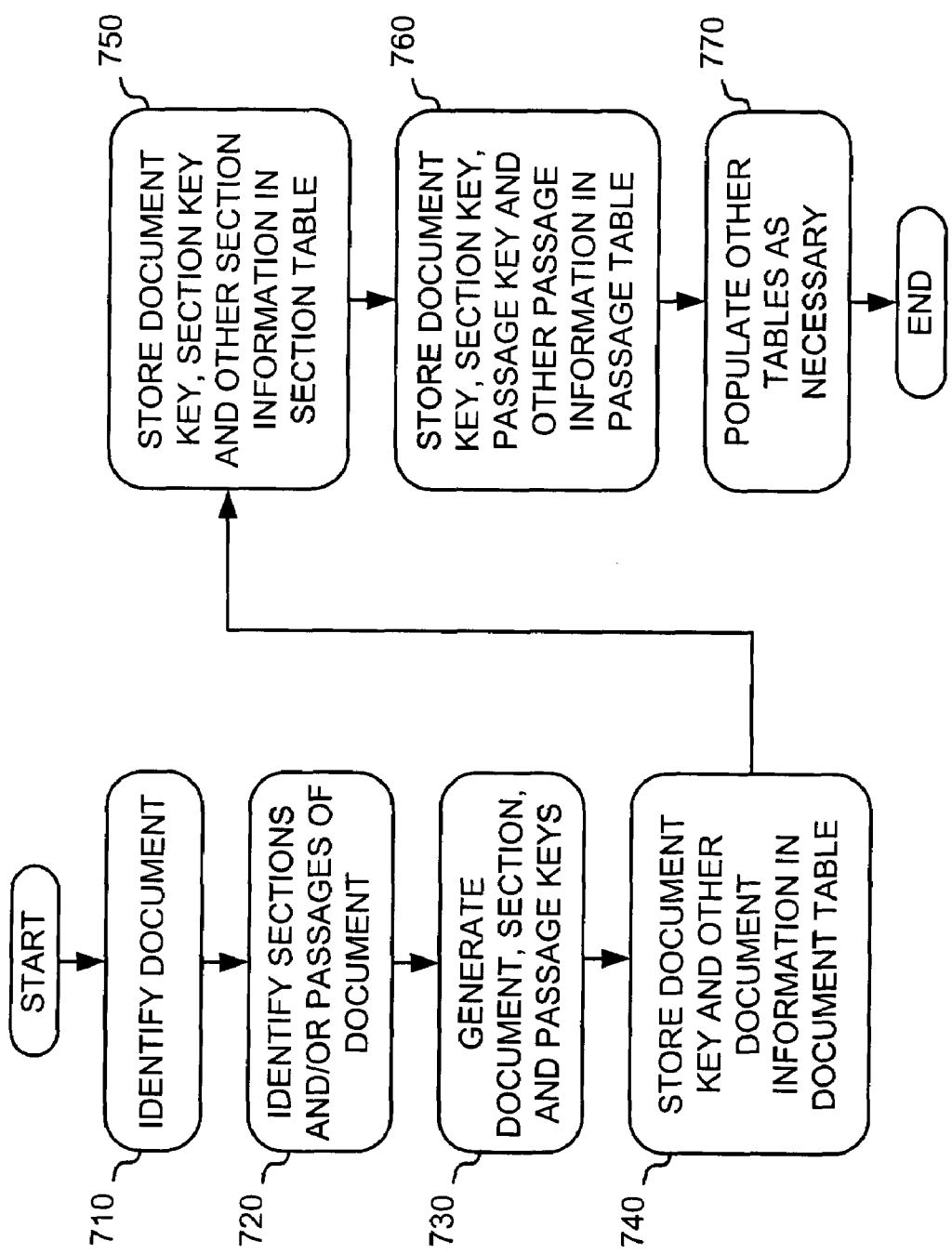
FIG. 7 is a flowchart of exemplary processing for populating a database according to an implementation consistent with the principles of the invention.

FIG. 7 is a flowchart of exemplary processing for populating database 140 according to an implementation consistent with the principles of the invention. The acts that follow may be performed by data analyzers 122, 124, and 126, loader 130, database 140, or a combination of these components.

Figure 8:
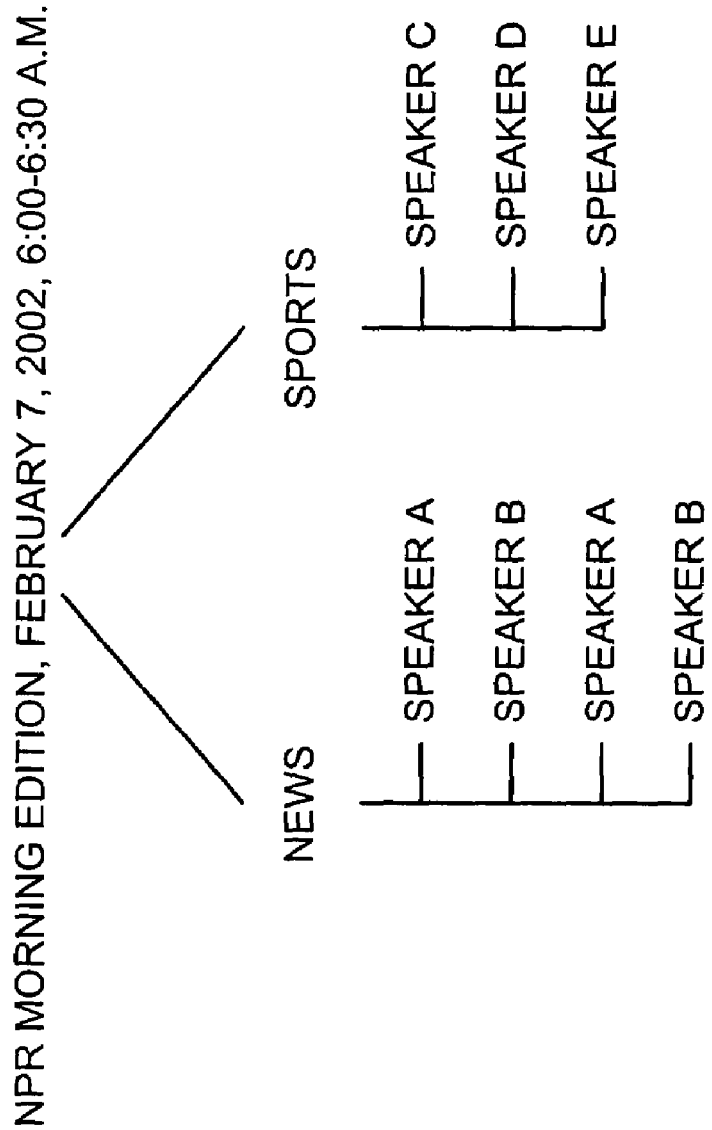
FIG. 8 is a diagram of an exemplary audio input stream.

Processing may begin with a document being identified (act 710). This document identification might include obtaining an audio, video, or text document from multimedia sources 110. As described above, a document may include a span of media from beginning to end or from time A to time B. Assume that the document relates to an audio input stream from NPR Morning Edition on Feb. 7, 2002, from 6:00 a.m. to 6:30 a.m. eastern. FIG. 8 is a diagram of such an exemplary audio input stream.

Returning to FIG. 7, once a document has been identified, sections and/or passages within the document may be identified (act 720). Sections within the document may be differentiated by their thematic properties. In the example of FIG. 8, assume that the NPR document includes two regions that have different thematic properties: news and sports scores. Because the news and sports scores relate to different topics, they may be identified as different sections for the NPR document.

Passages within a section may be differentiated by their linguistic or structural properties. In the example of FIG. 8, assume that two speakers (A and B) speak twice each during the news section and that three speakers (C, D, and E) speak during the sports section. The speaker turns may be used to identify different passages. In this case, the four speaker turns during the news section would lead to four passages: Speaker A (1) (to identify the first occurrence of Speaker A), Speaker B (1), Speaker A (2), and Speaker B (2). The three speaker turns during the sports section would lead to three passages: Speaker C, Speaker D, and Speaker E.

Document key 215, section key(s) 225, and passage key(s) 235 may be generated for the document and each of the identified sections and passages within the document (act 730). Document key 215 may uniquely identify the document. In the example of FIG. 8, document key 215 may be named "NPR Morning Edition on Feb. 7, 2002, from 6:00 a.m. to 6:30 a.m. eastern." Each of section keys 225 may uniquely identify a section within the document identified by document key 215. In the example of FIG. 8, section keys 225 may be named "News" and "Sports" or, more simply, "Section 1" and "Section 2." Each of passage keys 235 may uniquely identify a passage within a section identified by one of section keys 225. In the example of FIG. 8, passage keys 235 may be named "Speaker A (1)," "Speaker B (1)," "Speaker A (2)," and "Speaker B (2)" for the passages of the news section, and "Speaker C," "Speaker D," and "Speaker E" for the passages of the sports section.

A record in document table 210 of database 140 may be created for the new document. Document key 215 and, possibly, other document-related information may then be stored in the record within document table 210 (act 740). The other document-related information may include data relating to the time the document was created, the source of the document, a title of the document, the time the document started, the duration of the document, the region, subregion, and country in which the document originated, and/or the language in which the document was created.

Record(s) in section table 220 of database 140 may be created for the identified section(s) of the document. Document key 215, section key 225, and, possibly, other section-related information may then be stored in each of the records within section table 220 (act 750). The other section-related information may include data relating to the start time of the section, the duration of the section, and/or the language in which the section was created.

Record(s) in passage table 230 of database 140 may be created for the identified passage(s) of the document. Document key 215, section key 225, passage key 235, and, possibly, other passage-related information may then be stored in each of the records within passage table 230 (act 760). The other passage-related information may include data relating to the start time of the passage, the duration of the passage, the name of a speaker in the passage, the gender of a speaker in the passage, and/or the language in which the passage was created.

Figure 9:
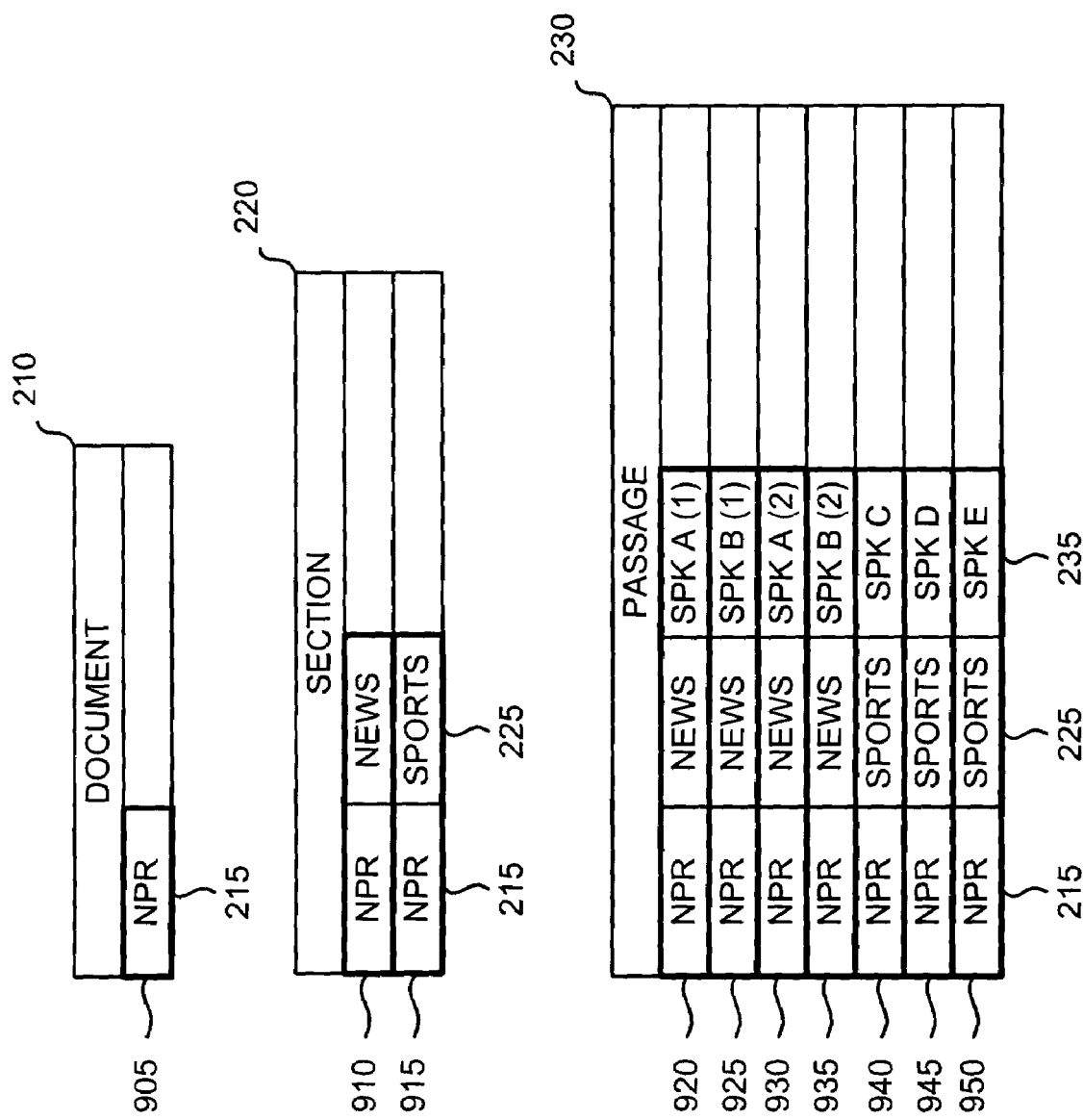
FIG. 9 is a diagram of a document table, section table, and passage table populated with values from the example of FIG. 8.

FIG. 9 is a diagram of document table 210, section table 220, and passage table 230 populated with values from the example of FIG. 8. Document table 210 includes a record 905 that stores "NPR Morning Edition on Feb. 7, 2002, from 6:00 a.m. to 6:30 a.m. eastern" as its document key 215. Section table 220 includes two records: records 910 and 915. Record 910 includes "NPR" document key 215 and stores "News" as its section key 225. Record 915 includes "NPR" document key 215 and stores "Sports" as its section key 225.

Passage table 230 includes seven records: records 920-950. Record 920 includes "NPR" document key 215 and "News" section key 225, and stores "Speaker A (1)" as its passage key 235. Record 925 includes "NPR" document key 215 and "News" section key 225, and stores "Speaker B (1)" as its passage key 235. Record 930 includes "NPR" document key 215 and "News" section key 225, and stores "Speaker A (2)" as its passage key 235. Record 935 includes "NPR" document key 215 and "News" section key 225, and stores "Speaker B (2)" as its passage key 235. Record 940 includes "NPR" document key 215 and "Sports" section key 225, and stores "Speaker C" as its passage key 235. Record 945 includes "NPR" document key 215 and "Sports" section key 225, and stores "Speaker D" as its passage key 235. Record 950 includes "NPR" document key 215 and "Sports" section key 225, and stores "Speaker E" as its passage key 235.

Returning to FIG. 7, other tables within database 140, such as full text table 510, topic labels table 520, named entity table 530, and facts table 540, may be populated with information from the document (act 770). For example, the full text of the document may be stored in full text table 510, topics relating to the document may be stored in topic labels table 520, names of people, places, and/or organizations may be stored in named entity table 530, and facts regarding people, places, and/or organizations may be stored in facts table 540.

CONCLUSION

Systems and methods consistent with the present invention provide multimedia information management in a manner that treats different types of data items (e.g., audio, video, and text) the same for storage and retrieval purposes.

A set of keys (document, section, and passage) are chosen that are common to all of the data item types. All of the data items are assigned relative to the keys.

For any document, section of a document, or passage of a section, data features that are bounded within the same region may be easily extracted. For a section, for example, data features, such as named entities, time/offset codes (i.e., the time or place at which a word occurs), and extracted facts, can be easily retrieved. Similarly, for a name in a paragraph of text, the section and/or document containing that text may be easily located and retrieved.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, three main tables (document, section, and passage) have been described. In other implementations consistent with the principles of the invention, a fourth table may be included that defines the time or offset at which words occur in a document. In the case of audio or video data, the time/offset may identify the time at which a word was spoken. In the case of text, the time/offset may identify the character offset of a word. The time/offset table may include a combination of document key 215, section key 225, passage key 235, and a time/offset key as its primary key.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for storing multimedia data items in a database, comprising:
   receiving data items from a plurality of types of media sources;
   identifying regions of the data items, the regions including document regions, section regions, and passage regions, each of the section regions corresponding to one of the document regions, each of the passage regions corresponding to one of the section regions and one of the document regions;
   generating document keys for the document regions;
   generating section keys for the section regions;
   generating passage keys for the passage regions;
   storing the document keys as separate records in a document table in the database;
   storing the section keys and corresponding ones of the document keys as separate records in a section table in the database; and
   storing the passage keys and corresponding ones of the document keys and the section keys as separate records in a passage table in the database.

2. The method of claim 1, wherein the media sources include audio sources, video sources, and text sources.

3. The method of claim 1, wherein at least one of the data items includes one of the document regions, one or more of the section regions, and one or more of the passage regions.

4. The method of claim 1, wherein each of the document regions includes a body of media that is contiguous in time.

5. The method of claim 1, wherein each of the section regions includes a contiguous portion that pertains to a theme or topic within one of the document regions.

6. The method of claim 1, wherein each of the passage regions includes a contiguous portion that has a linguistic or structural property within one of the section regions.

7. The method of claim 1, wherein the document regions, the section regions, and the passage regions form hierarchies.

8. The method of claim 1, wherein the document keys uniquely identify corresponding ones of the document regions.

9. The method of claim 1, wherein the section keys uniquely identify corresponding ones of the section regions of corresponding ones of the document regions.

10. The method of claim 1, wherein the passage keys uniquely identify corresponding ones of the passage regions of corresponding ones of the section regions and corresponding ones of the document regions.

11. The method of claim 1, wherein the storing the document keys further includes:
    creating a plurality of records in the document table.

12. The method of claim 11, wherein the storing the document keys further includes:
    storing, for each of the document keys, in one of the records of the document table, at least one of a time the document region was created, a source of the document region, a title of the document region, a time the document region started, a country in which the document region originated, or a language in which the document region was created.

13. The method of claim 1, wherein the storing the section keys further includes:
    creating a plurality of records in the section table.

14. The method of claim 13, wherein the storing the section keys further includes:
    storing, for each of the section keys, in one of the records of the section table, at least one of a start time of the section region, a duration of the section region, or a language in which the section region was created.

15. The method of claim 1, wherein the storing the passage keys further includes:
    creating a plurality of records in the passage table.

16. The method of claim 15, wherein the storing the passage keys further includes:
    storing, for each of the passage keys, in one of the records of the passage table at least one of a start time of the passage region, a duration of the passage region, a name of a speaker in the passage region, a gender of a speaker in the passage region, or a language in which the passage region was created.

17. The method of claim 1, further comprising:
    creating a full text table; and
    storing text relating to the data items in the full text table.

18. The method of claim 1, further comprising:
    creating a topic labels table; and
    storing topics relating to the section regions in the topic labels table.

19. The method of claim 1, further comprising:
    creating a named entity table; and
    storing, in the named entity table, names of people, places, and organizations identified within the passage regions, the section regions, or the document regions.

20. The method of claim 1, further comprising:
    creating a facts table; and
    storing, in the facts table, factual information regarding people, places, and organizations identified within the passage regions, the section regions, or the document regions.

21. The method of claim 1, further comprising:
identifying words located in at least one of the passage regions, the section regions, or the document regions;
generating time/offset keys for each of the words, the time/offset keys identifying times at which corresponding ones of the words were spoken or character offsets of corresponding ones of the words; and
storing the time/offset keys in a time/offset table in the database.

22. The method of claim 21, wherein each of the time/offset keys corresponds to one of the passage regions, one of the section regions, or one of the document regions; and
wherein the storing the time/offset keys includes:
storing the time/offset keys and corresponding ones of the document keys, the section keys, or the passage keys in the time/offset table.

23. The method of claim 1, further comprising:
forming a primary key in the passage table based on one of the passage keys, a corresponding one of the section keys, and a corresponding one of the document keys.

24. The method of claim 1, further comprising:
retrieving information relating to one of the data items based on information in at least one of the document table, the section table, or the passage table.

25. A system, implemented by one or more computer devices, for facilitating searching and retrieval of multimedia data items, comprising:
means for receiving data items from a plurality of types of media sources;
means for identifying regions in the data items, the regions including document regions, section regions, and passage regions, each of the section regions corresponding to one of the document regions, each of the passage regions corresponding to one of the section regions and one of the document regions;
means for generating document keys that identify the document regions;
means for generating section keys that identify the section regions;
means for generating passage keys that identify the passage regions;
means for creating a document table, a section table, and a passage table;
means for storing the document keys as separate records in the document table;
means for storing the section keys and corresponding ones of the document keys as separate records in the section table; and
means for storing the passage keys and corresponding ones of the document keys and the section keys as separate records in the passage table.

26. A system, implemented by one or more computer devices, for facilitating searching and retrieval of multimedia data items, comprising:
a database configured to store:
a document table that includes a plurality of document records,
a section table that includes a plurality of section records, and
a passage table that includes a plurality of passage records; and
a loader connected to the database and configured to:
receive data items from a plurality of types of media sources,
identify regions in the data items, the regions including document regions, section regions, and passage regions, each of the section regions corresponding to one of the document regions, each of the passage regions corresponding to one of the section regions and one of the document regions,
store document identifiers relating to the document regions in separate ones of the document records in the document table,
store section identifiers relating to the section regions in separate ones of the section records in the section table, and
store passage identifiers relating to the passage regions in separate ones of the passage records in the passage table.

27. The system of claim 26, wherein when storing the section identifiers, the loader is configured to:
store section identifiers and corresponding ones of the document identifiers in separate ones of the section records.

28. The system of claim 26, wherein when storing the passage identifiers, the loader is configured to:
store passage identifiers and corresponding ones of the document identifiers and the section identifiers in separate ones of the passage records.

29. The system of claim 26, wherein the media sources include audio sources, video sources, and text sources.

30. The system of claim 26, wherein at least one of the data items includes one of the document regions, one or more of the section regions, and one or more of the passage regions.

31. The system of claim 26, wherein each of the document regions includes a body of media that is contiguous in time.

32. The system of claim 26, wherein each of the section regions includes a contiguous portion that pertains to a theme or topic within one of the document regions.

33. The system of claim 26, wherein each of the passage regions includes a contiguous portion that has a linguistic or structural property within one of the section regions.

34. The system of claim 26, wherein the document regions, the section regions, and the passage regions form hierarchies.

35. The system of claim 26, wherein the document identifiers uniquely identify corresponding ones of the document regions, the section identifiers uniquely identify corresponding ones of the section regions of corresponding ones of the document regions, and the passage identifiers uniquely identify corresponding ones of the passage regions of corresponding ones of the section regions and corresponding ones of the document regions.

36. The system of claim 26, wherein when storing the document identifiers, the loader is configured to:
store, for each of the document identifiers, in one of the document records, at least one of a time the document region was created, a source of the document region, a title of the document region, a time the document region started, a country in which the document region originated, or a language in which the document region was created.

37. The system of claim 26, wherein when storing the section identifiers, the loader is configured to:
store, for each of the section identifiers, in one of the section records, at least one of a start time of the section region, a duration of the section region, or a language in which the section region was created.

38. The system of claim 26, wherein when storing the passage identifiers, the loader is configured to:
store, for each of the passage identifiers, in one of the passage records, at least one of a start time of the passage region, a duration of the passage region, a name of a speaker in the passage region, a gender of a speaker in the passage region, or a language in which the passage region was created.

39. The system of claim 26, wherein the database is further configured to store:
a full text table that stores text relating to the data items.

40. The system of claim 26, wherein the database is further configured to store:
a topic labels table that stores topics relating to the section regions.

41. The system of claim 26, wherein the database is further configured to store:
a named entity table that stores names of people, places, and organizations identified within the passage regions, the section regions, or the document regions.

42. The system of claim 26, wherein the database is further configured to store:
a facts table that stores factual information regarding people, places, and organizations identified within the passage regions, the section regions, or the document regions.

43. The system of claim 26, wherein the database is further configured to store:
a time/offset table that includes a plurality of time/offset records.

44. The system of claim 43, wherein the loader is further configured to:
identify words located in at least one of the passage regions, the section regions, or the document regions, and
store time/offset identifiers relating to the words in separate ones of the time/offset records, the time/offset identifiers identifying times at which corresponding ones of the words were spoken or character offsets of corresponding ones of the words.

45. The system of claim 44, wherein at least one of the time/offset identifiers corresponds to one of the passage regions, one of the section regions, and one of the document regions.

46. The system of claim 26, wherein the loader is further configured to create a primary key in the passage table based on one of the passage identifiers, one of the section identifiers, and one of the document identifiers.

47. The system of claim 26, further comprising:
a server to retrieve information relating to one of the data items based on information in at least one of the document table, the section table, or the passage table.

* * * * *